United States Patent [19]
Lindell

[11] Patent Number: 5,323,104
[45] Date of Patent: Jun. 21, 1994

[54] METHOD AND ARRANGEMENT FOR DEMODULATING A FREQUENCY MODULATED SIGNAL

[75] Inventor: Karl B. Lindell, Lidingö, Sweden

[73] Assignee: Ericsson GE Mobile Communications Inc., Research Triangle Park, N.C.

[21] Appl. No.: 38,275

[22] Filed: Mar. 29, 1993

[30] Foreign Application Priority Data

Mar. 30, 1992 [SE] Sweden .............................. 9200990

[51] Int. Cl.$^5$ .......................................... G01R 23/14
[52] U.S. Cl. .............................. 324/76.42; 324/76.38; 324/76.43; 324/76.41; 455/226.1; 375/97; 375/111
[58] Field of Search ............... 375/97; 455/226.1; 324/76.38, 76.41, 76.42, 76.43, 76.23, 76.24

[56] References Cited

U.S. PATENT DOCUMENTS

| | | | |
|---|---|---|---|
| 3,548,328 | 12/1970 | Breikss . | |
| 3,600,680 | 8/1971 | Maniere et al. . | |
| 3,670,250 | 6/1972 | Fritkin . | |
| 3,882,398 | 5/1975 | Ogita | 324/76.41 |
| 4,135,243 | 1/1979 | Peregrino | 324/76.42 |
| 4,236,110 | 11/1980 | Shearer et al. . | |
| 4,409,984 | 10/1983 | Dick . | |
| 4,425,543 | 1/1984 | Adams | 324/76.41 |
| 4,852,123 | 7/1989 | Bickley | 324/76.43 |
| 4,916,383 | 4/1990 | Sayers | 324/76.43 |
| 5,191,386 | 3/1993 | Grebe | 324/76.41 |
| 5,210,484 | 5/1993 | Remillard | 324/76.41 |

FOREIGN PATENT DOCUMENTS 2086158 5/1982 United Kingdom .

Primary Examiner—Kenneth A. Wieder
Assistant Examiner—Jose M. Solis
Attorney, Agent, or Firm—Burns, Doane, Swecker & Mathis

[57] ABSTRACT

The invention relates to a method and to an arrangement for demodulating a signal (f) preferably frequency modulated with digital information, and then particularly a frequency shift modulated signal, with a frequency counter detector (16) which directly produces a digital value representative of the instantaneous frequency of the frequency modulated signal. In order to obtain the lowest possible uncertainty in frequency detection at unchanged counter frequencies ($f_r$), the frequency modulated signal is mixed down to a difference frequency ($f_3$) which is insignificantly higher than the sampling frequency ($f_s$) required to extract the modulation information from the instantaneous counter value ($N_2$) The frequency counter detector begins a counting sequence during each of the periods of the difference frequency.

4 Claims, 1 Drawing Sheet

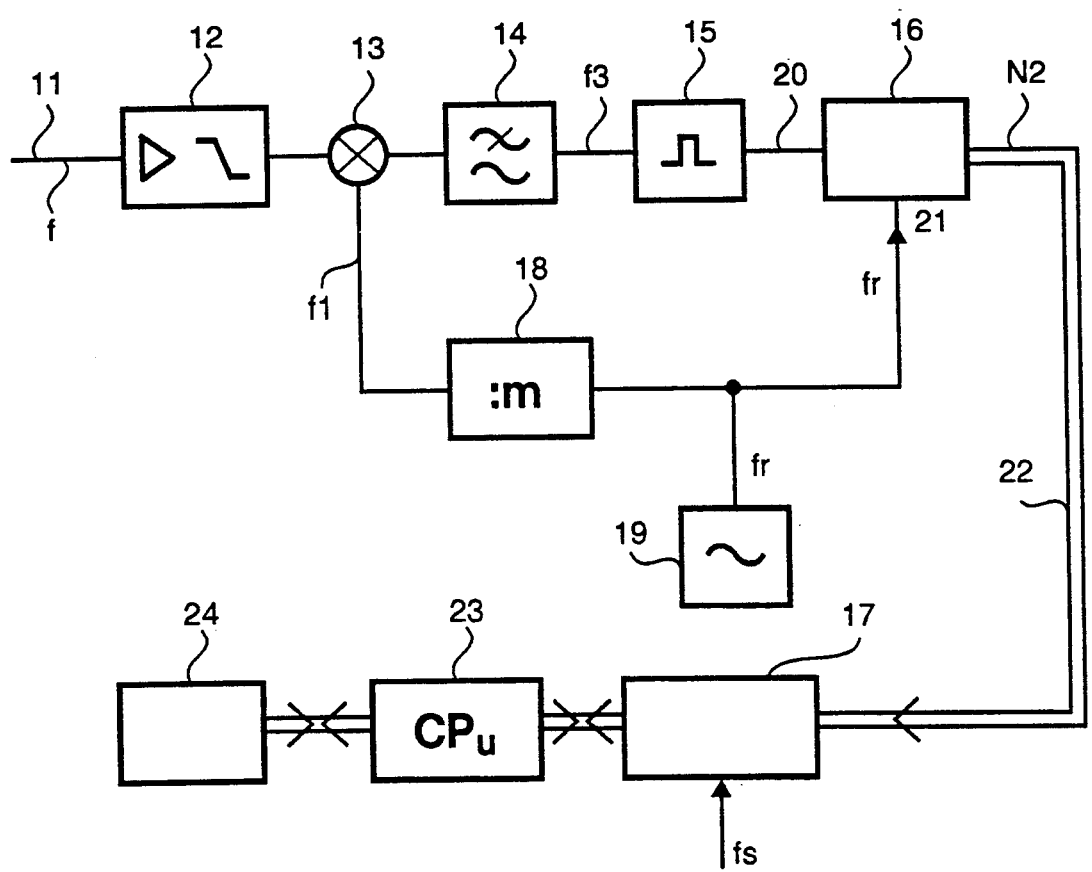
Fig.

METHOD AND ARRANGEMENT FOR DEMODULATING A FREQUENCY MODULATED SIGNAL

TECHNICAL FIELD

The present invention relates to a method and an arrangement for demodulating a frequency modulated signal, and particularly a frequency shift modulated signal, preferably in a radio communication system for the transmission of digital signals.

BACKGROUND ART

In certain kinds of data communication systems using radio links, it is usual to use frequency-shift modulation in signal modulating processes. This enables standard components to be used to a large extent on the receiver side, for instance in the final stage of the intermediate frequency part and in the FM detector. The intermediate frequency amplifier will then consist of an amplitude limiting amplifier which delivers an MF signal of constant amplitude and of the square-wave type. The most common type of detector is of the analogue type, for instance, a quotient detector which produces an analogue detected signal. In the majority of mobile radio systems, digital signal processing is used to detect and to correct errors. It is known to use an A/D-converter connected to the output of the FM-detector in order to obtain a digital signal for signal processing purposes. In the case of a mobile data communication system, for instance, of the MOBITEX type (registered trademark), problems occur with regard to detector temperature drift and detector zero point errors.

It is known, for instance in U.S. Pat. No. 3,548,328, U.S. Pat. No. 3,600,680, U.S. Pat. No. 3,670,250, U.S. Pat. No. 4,236,110 or U.S. Pat. No. 4,409,984 to determine in an FM receiver and a frequency meter the frequency of a square wave of frequency f with the aid of a digital period counter which is clocked with a reference oscillator with a high degree of accuracy. The reference oscillator having frequency $f_r$ feeds a counter which counts-in reference pulses $f_r$ over a maximum measuring time T. The maximum measuring time T is determined by the information theoretical consideration (the sampling theorem). In the studied system, the requisite sampling frequency is 32 kHz, which gives a maximum measuring time of $1/32.10^{-3s}$.

When the center frequency of the FM signal is $f_{nom}$, it is possible to count in approximately $f_{nom}T$ periods of the signal f during the measuring time T. If a fixed number of $N_1 = f.T$ periods of the current intermediate frequency f is now allowed to gate reference frequency pulse forwards to the counter, the counter will counting $N_2$ periods of the reference frequency $f_r$. The period time for $N_1$ periods of f can then be determined with a normal counter uncertainty of ±1 period of the reference frequency $f_r$. The number of pulses is a non-linear function of the detected frequency and therefore requires a linearising operation in order for the output signal to be a linear function of the frequency. Such a conversion can be effected, for instance, through the use of tables or with the aid of an appropriate arithmetical operation, in a manner known per se. Similarly, the modulation frequency can be obtained through the use of a simple, known operation.

The error in the time period will be $$\epsilon = \pm 1/f_r.1/N_1 = \pm 1/f_r.1/f_{nom}.1/T \text{ and the relative error will be } \epsilon = \pm 1/f_r.T \quad (1)$$

According to one current example, in which the reference frequency obtained from a clock generator common to the unit, $f_r$ was equal to $12.8.10^6$ Hz and T was equal to $10^{-3}/32$ s.

This gave a relative error of $\epsilon_r = 2.5.10^{-3}$. Consequently, at an intermediate frequency of $450.10^3$ Hz the uncertainty in the determination of the frequency f is $$\epsilon = 450.10^3.2.5.10^{-3} \quad (2)$$

Consequently, it is scarcely possible to determine the frequency with an accuracy greater than ±1125 Hz when using purely digital methods at the intermediate frequency of 450 kHz normally used.

SUMMARY OF THE DISCLOSURE

The object of the present invention is to provide a method and an arrangement for demodulating in a receiver mobile radio traffic a frequency modulated digital signal which is essentially comprised of a rectangular wave, by counting the number of periods of a reference frequency $f_r$ which occurs over a predetermined number of periods of the frequency modulated signal. The receiver often includes a reference oscillator whose frequency is determined by other functions in the receiver. The frequency of this oscillator is often too low to provide sufficient accuracy in the frequency determining process when it is used for a frequency detector of the aforesaid kind (see the above example). According to the invention, there can be employed a receiver which is constructed of standard components, and an existing reference frequency, without jeopardising accuracy. The characteristic features of the invention are set forth in the following claims.

BRIEF DESCRIPTION OF THE DRAWING

The single Figure of the drawing is a block schematic illustrating the parts concerned in a mobile radio receiver.

DETAILED DESCRIPTION

The reference numeral 11 shown in the Figure identifies the input of a limiting intermediate frequency amplifier 12. The intermediate frequency f which is normally obtained from a second mixer usually has the carrier wave frequency 450 kHz. The carrier wave is, for instance, modulated with $f_d = \pm 4$ kHz. The signal obtained on the output of the limiting amplifier 12 is a square wave signal, or can readily be converted to such a signal. The limiting intermediate frequency amplifier 12 may be of a standard type used in various types of receiver for frequency modulated signals. The output signal of the amplifier 12 is delivered to a mixer 13 of conventional kind, in which the signal is mixed with a signal having the frequency $f_1$ obtained from a frequency divider 18 which divides the output frequency $f_r$ from the receiver reference oscillator 19 by a factor m.

The output product from the mixer 13 is filtered in a lowpass filter 14 which filters out the difference frequency $f_3 = f_1 - f$. The difference signal is converted in a pulse former 15 back to a square wave which controls the counter circuit 16. Subsequent to the mixing process, this square wave is the modulated with a frequency deviation which is unchanged $f_d$. When a square wave having the instantaneous frequency $f \pm f_d$ appears on the counter control input, the counter starts to count and counts the pulses from the reference oscillator 19 on the input 21 until the square wave again ceases. The number of pulses $N_2$ counted during the measuring period is therefore a measurement of the instantaneous period time T for the third intermediate frequency $f_3$. Since $N_2$ is a non-linear function of the frequency, there is effected in the counter circuit a correction which involves adding a correction term to the counter value read-out, so that this value will represent the frequency of the received signal.

In one example, the intermediate frequency $f = 450$ kHz, the modulation deviation $f_d \pm 4$ kHz, the reference oscillator frequency $f_r = 12.8$ MHz, and the dividing factor $m = 26$. The mixing frequency $f_1$ was then 492.31 kHz and the difference frequency of the mixer was 42.31 kHz. The counter circuit produced a digital value which uncorrected varies $\pm 30$ from an intermediate value of 302.

According to equations 1 and 2 above, there is obtained with the selected values a relative error $\epsilon = 3.3 \cdot 10^{-10}$, and an absolute error $\epsilon = 140$ Hz. This value lies well beneath the maximum uncertainty for positive detection about $\pm 250$ Hz, that may be allowed.

The output 22 of the counter circuit 16 is connected to a digital demodulator and decoder 17 which use an appropriate sampling frequency $f_s$ for the chosen modulation. The digital data obtained after demodulation and decoding is collected, for instance, by a processor 23 for storage in a suitable memory, from which the data can be collected by a user for further processing. Demodulators and decoders for digital signals are well known within the art and form no part of the present invention.

I claim:

1. A method for measuring in an FM-receiver for land mobile radio traffic the instantaneous frequency of an intermediate frequency signal which is frequency shift modulated with digital signals, said intermediate frequency signal comprising essentially a rectangular wave, by repeatedly counting reference pulses of high frequency during at least one period of the intermediate frequency signal and continuously reading the counter value as a representation of the instantaneous frequency of the frequency modulated signal, said method comprising the steps of:

mixing the intermediate frequency with a locally generated signal which has a frequency such that a difference frequency between the intermediate frequency signal and the locally generated signal is insignificantly higher than a sampling signal required for detecting and decoding the intermediate signal transferred by frequency shift modulation; and effecting said repeated counting of the reference pulses over a period of the difference frequency.

2. A method according to claim 1, wherein said locally generated signal is obtained by dividing down the reference pulses.

3. A method according to claim 1, wherein the difference frequency signal is reformed into a rectangular wave prior to said signal controlling the reference pulse counting process.

4. An arrangement for measuring the instantaneous frequency of a frequency modulated signal, comprising an FM-receiver having at least one amplitude limiting MF-stage, and a counter detector which functions to count reference pulses of given frequency during a determined interval of the frequency modulated signal, comprising:

a mixer stage having an input stage connected to the MF-stage, and a signal source, wherein a mixer stage output is connected to a circuit for filtering-out and pulse-forming a difference frequency between the MF-signal and the frequency of the signal source; and a control input on the counter detector which is connected to the output of said circuit so as to activate the counter during each period of the difference frequency and so that the counter output will constantly deliver a digital value which represents the instantaneous frequency of the difference frequency, wherein the signal source frequency is so selected that the difference frequency will only be slightly higher than the sampling frequency required to detect a digital signal modulating the carrier wave.

* * * * *